Patented May 5, 1931

1,803,503

UNITED STATES PATENT OFFICE

IVAN GUBELMANN AND JOHN M. TINKER, OF SOUTH MILWAUKEE, WISCONSIN, ASSIGNORS, BY MESNE ASSIGNMENTS, TO NEWPORT CHEMICAL CORPORATION, A CORPORATION OF DELAWARE

1,2- AND 2,3-DIAMINO ANTHRAQUINONE SULPHATES AND METHOD OF PREPARING AND ISOLATING THE SAME

No Drawing.    Application filed January 3, 1928. Serial No. 244,371.

This invention relates to 1,2- and 2,3-diamino anthraquinone sulphates and to a method of preparing and isolating the same.

In the co-pending application of Roger Adams et al. entitled "3,4-diamino benzoyl ortho benzoic acids and a process of making the same," Serial No. 135,293, filed Sept. 13, 1926, now Patent No. 1,663,229, dated March 20, 1928, there is disclosed a method of preparing 1,2- and 2,3-diamino anthraquinone from 3',-4' diamino ortho benzoyl benzoic acids by closing the ring and eliminating one molecule of water in the presence of concentrated sulphuric acid.

It is now an object of this invention to provide an economical, practical method for preparing 1,2- and 2,3-diamino anthraquinone sulphates by the condensation of 3',4' diamino ortho benzoyl benzoic acid and further to provide a method of isolating these two isomers either as the respective sulphates or as the respective bases.

It is a further object of this invention to provide a method for preparing 1,2- and 2,3-diamino anthraquinones, which are of themselves important intermediates in the preparation of valuable dyestuffs.

Other and further important objects of this invention will become apparent from the following description and appended claims.

We have now discovered that these isomers may be very effectively separated from a mixture containing them by means of a selective precipitation of the sulphates of the respective amines in various concentrations of sulfuric acid. 2,3-diamino anthraquinone sulphate precipitates quite completely in sulfuric acid of concentration equal to about 83%, whereas the 1,2-isomer is sufficiently soluble at this concentration to permit a separation to be effected. The 1,2-isomer on the other hand is sufficiently insoluble in acid of about 67% strength to permit its separation from a sulfuric acid solution of that strength.

In general, our present method comprises the elimination of one molecule of water from 3',4'-diamino-ortho-benzoyl-benzoic acid and the simultaneous closing of the ring to form a mixture of 1,2-diamino anthraquinone and 2,3-diamino anthraquinone. The following unbalanced equation will serve to illustrate the reaction graphically:

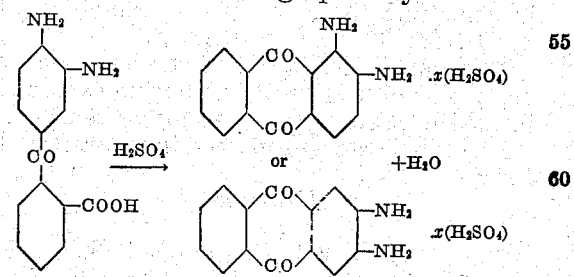

As dehydration agent we employ concentrated sulfuric acid of 90 to 100% strength. The ring closed mass is then diluted with water to an acid concentration corresponding to about 83% sulfuric acid, whereby the 2,3-isomer separates in the form of its sulphate. After filtration, the acid solution of the 1,2-isomer is diluted further with water to an acid concentration of about 67% strength, at which concentration the 1,2-isomer separates and is filtered. The sulphates of the respective isomers may be transformed into their corresponding bases by treatment with alkali solutions.

2,3-diamino anthraquinone sulphate, having the following formula,

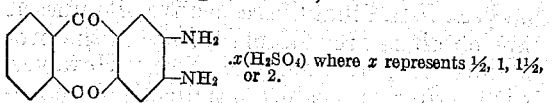

is obtained as a grayish precipitate from an 83% sulfuric acid solution. Upon suspending this precipitate in water, this sulphate is transformed into a golden colored precipitate, probably the form containing ½ molecule of sulfuric acid to the molecule of base. Upon treating this with a dilute solution of caustic soda, it is transformed into a brick red precipitate which is the 2,3-diamino anthraquinone. This upon drying has a melting point of about 368° C. It dissolves easily in 60% oleum imparting thereto a yellowish brown coloration.

1,2-diamino anthraquinone sulphate, having the following formula,

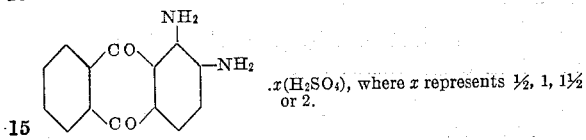

is obtained as a grayish precipitate from a 63% sulfuric acid solution. Upon suspending this precipitate in water, it is likewise transformed into a golden precipitate, but slightly browner than the 2,3-isomer. Upon the addition of dilute caustic soda, it is transformed into the purplish base of the 1,2-isomer. This isomer after drying had a melting point of about 298° C. It is soluble in 60% oleum imparting thereto a strong blue coloration. The Kjeldahl analysis for nitrogen showed 11.68% nitrogen, which is within experimental error when compared to 11.76% for the theoretical value.

Without limiting our invention to any particular procedure, the following example, in which parts by weight are given, will serve to illustrate our method in its preferred form.

*Example*

337 parts of 3',4'-diamino-ortho-benzoyl-benzoic acid are dissolved in 3700 parts of hot concentrated 98% sulfuric acid. The mass is held at 185° C. for about ¼ hour. The ring closed mass is then cooled to 100 to 130° C. and 600 parts of water added. Upon cooling to room temperature, the 2,3-diamino anthraquinone separates and is filtered off. The filtrate analyzing about 83% sulfuric acid is then further diluted with about 1000 parts of water to about 67% acid concentration and again cooled to room temperature. The 1,2-diamino anthraquinone sulphate now separates out and is filtered off. The sulphates of the respective amines are suspended in water and dilute caustic soda solution is added, whereupon the respective bases are obtained in relatively high purity as precipitates. It has been found that the respective diamines as thus obtained are suitable for use in the production of anthraquinone dyes. However, it is possible to produce practically pure isomers by a repetition of the above purification step.

We are aware of the fact that the closing of the ring may be effected under various concentrations of sulfuric acid but prefer to employ concentrations between 90 and 100% sulfuric acid. We are further aware of the fact that the conditions for isolation and the separation of the diamines may be varied somewhat as regards the concentration of sulfuric acid employed without materially effecting the results. We therefore do not purpose limiting the patent granted hereon other than as necessitated by the prior art.

We claim as our invention:

1. The process of preparing and isolating 1,2- and 2,3-diamino anthraquinone sulphates from a solution of the mixed anthraquinone isomers as produced in a reaction mass by condensing 3',4'-diamino-ortho-benzoyl-benzoic acid in concentrated sulphuric acid, which comprises diluting the reaction mass until the acid concentration is such that 2,3-diamino anthraquinone sulphate is selectively precipitated, removing the precipitated 2,3-diamino anthraquinone sulphate, further diluting the remaining reaction mass until 1,2-diamino anthraquinone sulphate is precipitated and recoving the 1,2-diamino anthraquinone sulphate.

2. The process of isolating 1,2- and 2,3-diamino anthraquinone sulphates, which comprises forming a solution of a mixture of 1,2- and 2,3-diamino anthraquinones in concentrated sulphuric acid, reducing the sulphuric acid concentration of the solution to a point at which 2,3-diamino anthraquinone sulphate is selectively precipitated, removing the precipitated body, further reducing the sulphuric acid concentration until 1,2-diaminoanthraquinone sulphate is precipitated and recovering the latter body separately.

3. The process of isolating 1,2- and 2,3-diamino anthraquinone sulphates, which comprises forming a solution of 1,2- and 2,3-diamino anthraquinones in concentrated sulphuric acid, diluting the solution to approximately 83% sulphuric acid concentration to precipitate out 2,3-diamino anthraquinone sulphate, filtering off the precipitated body, further diluting the filtrate to approximately 67% sulphuric acid concentration to precipitate out 1,2-diamino anthraquinone sulphate and recovering the latter body.

4. The process of isolating 1,2- and 2,3-diamino anthraquinones, which comprises forming a solution of 1,2- and 2,3-diamino anthraquinones in concentrated sulphuric acid, diluting the solution to approximately 83% sulphuric acid concentration to precipitate out 2,3-diamino anthraquinone sulphate, filtering off the precipitated body, further diluting the filtrate to approximately 67% sulphuric acid concentration to precipitate out 1,2-diamino anthraquinone sulphate, recovering the latter body and treating the respective isomeric bodies with an alkali to obtain 1,2-diamino anthraquinone base and 2,3-diamino anthraquinone base.

5. As a new article of manufacture, a diamino anthraquinone sulphate having the following general formula,

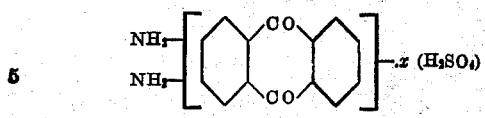

in which the NH₂ groups are in the (1,2-) or (2,3-) position and $x$ represents ½, 1, 1½, or 2.

6. As a new article of manufacture, 1,2-diamino anthraquinone sulphate having the following formula:

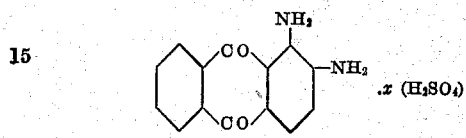

wherein $x$ represents ½, 1, 1½ or 2.

7. The process of separating 1,2- and 2,3-diamino-anthraquinones from each other, which comprises dissolving a mixture of the same in concentrated sulphuric acid, diluting the resulting mass to a sulfuric acid concentration of about 83% strength to precipitate 2,3-diamino anthraquinone sulphate and filtering the precipitated body.

8. As a new article of manufacture, a sulphuric acid salt of an ortho-diamino anthraquinone.

9. As a new article of manufacture, a sulphuric acid salt of 1,2-diamino-anthraquinone.

In testimony whereof we have hereunto subscribed our names at Carrollville, Milwaukee County, Wisconsin.

IVAN GUBELMANN.
JOHN M. TINKER.